US007725601B2

(12) United States Patent
Conzola et al.

(10) Patent No.: US 7,725,601 B2
(45) Date of Patent: May 25, 2010

(54) APPARATUS, SYSTEM, AND METHOD FOR PRESENTING A MAPPING BETWEEN A NAMESPACE AND A SET OF COMPUTING RESOURCES

(75) Inventors: Vincent Charles Conzola, Raleigh, NC (US); Craig Fulmer Everhart, Chapel Hill, NC (US); Elizabeth Hatfield, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 10/962,692

(22) Filed: Oct. 12, 2004

(65) Prior Publication Data

US 2006/0080465 A1 Apr. 13, 2006

(51) Int. Cl.
*G06F 15/16* (2006.01)
(52) U.S. Cl. .................. 709/245; 709/223; 707/100; 707/200; 715/205; 715/234; 715/760
(58) Field of Classification Search .................. 709/223, 709/245; 707/100, 200; 715/205, 234, 760
See application file for complete search history.

(56) References Cited

U.S. PATENT DOCUMENTS

| | | | | |
|---|---|---|---|---|
| 5,937,406 | A * | 8/1999 | Balabine et al. | 707/100 |
| 6,317,748 | B1 | 11/2001 | Menzies et al. | 707/103 X |
| 6,442,548 | B1 | 8/2002 | Balabine et al. | 707/10 |
| 7,035,930 | B2 * | 4/2006 | Graupner et al. | 709/226 |
| 7,111,061 | B2 * | 9/2006 | Leighton et al. | 709/224 |
| 2002/0120763 | A1 | 8/2002 | Miloushev et al. | 709/230 |
| 2002/0188758 | A1 * | 12/2002 | Nakajima et al. | 709/245 |
| 2003/0229689 | A1 * | 12/2003 | Raghavan et al. | 709/223 |
| 2004/0024786 | A1 | 2/2004 | Anderson et al. | 707/200 |
| 2005/0091214 | A1 * | 4/2005 | Probert et al. | 707/9 |
| 2005/0246401 | A1 * | 11/2005 | Edwards et al. | 707/205 |
| 2005/0246503 | A1 * | 11/2005 | Fair | 711/147 |
| 2005/0273451 | A1 * | 12/2005 | Clark et al. | 707/1 |

OTHER PUBLICATIONS

D. W. Cooper, "Implicit Table Look-up Access method", IBM Technical Disclosure Bulletin, vol. 14 No. 8 Jan. 1972, p. 2493-2495.
RD 42678, "A Virtual File System (VFS) Across Multiple Network Nodes and Disks", Research Disclosure, Article No. 78, p. 368.

* cited by examiner

*Primary Examiner*—Saleh Najjar
*Assistant Examiner*—Thuong T Nguyen
(74) *Attorney, Agent, or Firm*—Kunzler Needham Massey & Thorpe

(57) ABSTRACT

An apparatus, graphical user interface, system, and method are provided for presenting a mapping between a namespace and a set of computing resources. The apparatus includes an input module, a format module, and an output module. The input module obtains a mapping between namespace identifiers and a set of computing resources. The format module associates a namespace identifier and a computing resource according to the mapping. The output module provides the namespace identifiers and the associated computing resource corresponding to each namespace identifier. A graphical user interface includes a window with a file system pane and a fileset pane. The file system pane includes a first tree control that displays the components of the file system. The fileset pane includes a second tree control that displays the filesets. The tree controls are updated in response to user input in either the file system pane or the fileset pane.

28 Claims, 10 Drawing Sheets

APPARATUS, SYSTEM, AND METHOD FOR PRESENTING A MAPPING BETWEEN A NAMESPACE AND A SET OF COMPUTING RESOURCES

BACKGROUND OF THE INVENTION

1. Field of the Invention

The invention relates to computer network configurations. Specifically, the invention relates to apparatus, systems, graphical user interfaces, and methods for presenting a mapping between a namespace and a set of computing resources.

2. Description of the Related Art

Managing a computer network is complicated, especially if the network includes resources that a user can reference by more than one name or identifier. Computer networks commonly use mappings to link multiple names or identifiers to a single network resource. A namespace, or set of names, used in a computer network is often mapped to a set of computing resources. Using a namespace is typically more intuitive than using the literal name of the computing resource.

For example, Internet users identify web sites by domain names such as www.us.gov and www.uspto.gov. A set of domain names is one example of a namespace. A domain name server resolves each domain name to an Internet Protocol (IP) address. The IP address uniquely identifies a web server hosting the web site corresponding to the domain name.

For example, the domain name www.uspto.gov can be resolved to the IP address 199.107.69.75. An IP address can more generally be referred to as a computing resource. Accordingly, one example of a mapping that computer networks use is a mapping between a set of domain names (more generally referred to as a namespace) and a set of IP addresses (more generally referred to as a set of computing resources).

Mappings, such as the one described above, can make computer networks easier to use. For example, it would be difficult for an Internet user to remember the IP address 199.107.69.75 for the United States Government, but relatively easy for the user to remember the domain name www.us.gov. The mapping that links the domain name www.us.gov to the IP address 199.107.69.75 eliminates the need for the user to remember the IP address. The mapping is very useful since, in general, computing resources identifiers such as IP addresses are not intuitive.

Computer networks widely use mappings between namespaces and computing resources. In general, namespaces comprise user-friendly names used as aliases for less friendly identifiers of computing resources. A mapping simplifies use of a network. However, a network administrator needs to understand and manage the mapping. Often, while troubleshooting the network, the administrator needs to know the identifier of the computing resource, not the user-friendly name.

A Storage Area Network (SAN) file system can use a mapping between components of a file system and a group of filesets to simplify the presentation of the SAN file system. A mapping associates each component (a directory, file, or link) of the SAN file system with a fileset. A fileset is a logical segment of a virtual storage device that stores the components of the file system. A user refers to components of the SAN file system by name. However, in certain situations, a network administrator desires to know which fileset each component is associated with.

A typical method for managing the mapping between components of a SAN file system and a group of filesets is to use two different Graphical User Interfaces (GUI) to determine a file system to fileset relationship. FIG. 1 illustrates a file system GUI 100 and a fileset GUI 102. The file system GUI 100 comprises two panes. The left pane displays each of the components 104 of the SAN file system in a tree control. The right pane displays the contents of a selected directory named "NotesRal4" 106.

To determine which fileset the "NotesRal4" directory 106 is mapped to, the network administrator must use the fileset GUI 102. The network administrator searches through a list of filesets 108 to locate the fileset with a directory name 110 corresponding to the "NotesRal4" directory 106. A fileset name 112, associated with the fileset, can be different than the directory name 110. Using different names for the fileset name 112 and directory name 110 leads to confusion. Typically, the network administrator desires the fileset name 112 in order to perform a maintenance operation on the fileset.

Using two GUIs 100,102 to determine the mapping between a component 104 and a fileset name 112 is tedious and error prone. The network administrator performs a significant number of mouse clicks and visual inspection to determine the mapping. This manual process leads to errors in determining the mapping and makes troubleshooting difficult.

Alternatively, a network administrator may be tempted to try to remember the mapping between a component 104 and a fileset, and not take the time to look up the mapping. However, since mappings can change over time (for example, end user may make changes), the mapping memorized by the network administrator may not be accurate.

What is needed is a single GUI that displays the components 104 of a SAN file system and the corresponding fileset names 112 side by side. More generally, such a GUI should present a mapping between an arbitrary namespace and a corresponding set of computing resources. Administrators of IP addresses could use the GUI to display the mapping between domain names and IP addresses. Administrators of SAN file systems could use the GUI to display the mapping between file system components 104 and filesets.

From the foregoing discussion, it should be apparent that a need exists for an apparatus, system, graphical user interface, and method that presents a mapping of a namespace to a set of corresponding computing resources. Beneficially, such an apparatus, system, graphical user interface, and method would reduce the amount of time spent troubleshooting networks by providing information about the mapping in a more usable format.

SUMMARY OF THE INVENTION

The various embodiments of the present invention have been developed in response to the present state of the art, and in particular, in response to the problems and needs in the art that have not yet been met for presenting a mapping between a namespace and a set of computing resources. Accordingly, the various embodiments have been developed to provide an apparatus, system, graphical user interface, and method for presenting a mapping between a namespace and a set of computing resources that overcomes many or all of the above-discussed shortcomings in the art.

An apparatus according to one embodiment of the present invention includes an input module, a format module, and an output module. The input module obtains a mapping between namespace identifiers and a set of computing resources. The format module associates a namespace identifier and a computing resource according to the mapping. The output module simultaneously provides the namespace identifiers and the associated computing resource corresponding to each namespace identifier.

In certain embodiments, a refresh module updates the provided namespace identifiers and corresponding computing resources in response to changes made to the mapping. The output module may be further configured to present the namespace identifiers and corresponding computing resources side by side and present statistical information for each computing resource.

Embodiments of the apparatus present a mapping between a namespace and a set of computing resources for a Storage Area Network (SAN) file system, a domain name server, and a load balancing web server. A further embodiment presents a mapping between a file system and a set of database retrievals. Another embodiment may present a mapping between a file system and a set of storage volumes.

An apparatus according to one embodiment of the present invention includes an input module, a presentation module, and a refresh module. The input module obtains a mapping between components of a file system and a group of filesets. The presentation module simultaneously presents the components and the fileset corresponding to each component. The refresh module updates the presentation of the components and corresponding filesets in response to changes made to the mapping.

In one embodiment, the presentation module presents the components in a first tree control and the filesets in a second tree control. The presentation module may expand a corresponding branch of the second tree control in response to expanding a branch of the first tree control. Similarly, the presentation module may expand a corresponding branch of the first tree control in response to expanding a branch of the second tree control. An optional data module compiles statistical information for each fileset.

In one embodiment, the input module obtains a second mapping between each fileset and a set of storage volumes. The presentation module simultaneously presents each fileset and the set of storage volumes corresponding to each fileset. The refresh module updates the presentation of the fileset and corresponding set of storage volumes in response to changes made to the second mapping A Graphical User Interface (GUI) according to one embodiment of the present invention includes an input module, a window, and a refresh module. The input module obtains a mapping between components of a file system and a group of filesets. The window simultaneously displays the components of a file system in a first tree control and the fileset corresponding to each component in a second tree control. The tree controls are displayed side by side. The refresh module updates the display of the components and corresponding filesets in the window in response to changes made to the mapping.

Optionally, branch icons of the first tree control represent directories of the file system and leaf icons of the first tree control represent links and files of the file system. The window may comprise a file system pane side by side with a fileset pane. The file system pane and the fileset pane are updated in response to user input in the file system pane and the fileset pane. The first tree control may highlight the branch icons of the first tree control that correspond to fileset attach points (points at which filesets are connected to the SAN filesystem) by using a different icon, color, shading or the like for the branch icons.

A system according to one embodiment of the present invention includes a host, a storage device, a metadata server, a configuration module, and a storage area network (SAN).

The host utilizes files stored in a file system. The storage device stores components of the file system in a group of filesets. The metadata server processes requests to access the file system. The configuration module presents a mapping of the file system to the group of filesets. The SAN enables data transfer between the host, the storage device, and the metadata server.

The system optionally includes a configuration module client that displays the components of the file system and the corresponding filesets side by side and presents statistical information for each fileset.

The present invention also includes an embodiment arranged as machine-readable instructions that comprises substantially the same functionality as the components and steps described above in relation to the apparatus, GUI, and system. Embodiments of the present invention provide a generic presentation of a mapping between a namespace and a set of computing resources. The features and advantages of different embodiments will become more fully apparent from the following description and appended claims, or may be learned by the practice of embodiments of the invention as set forth hereinafter.

BRIEF DESCRIPTION OF THE DRAWINGS

In order that the advantages of the different embodiments of the invention will be readily understood, a more particular description of the embodiments briefly described above will be rendered by reference to specific embodiments that are illustrated in the appended drawings. Understanding that these drawings depict only typical embodiments of the invention and are not therefore to be considered to be limiting of its scope, the embodiments will be described and explained with additional specificity and detail through the use of the accompanying drawings, in which.

DETAILED DESCRIPTION OF THE INVENTION

Figure 1:
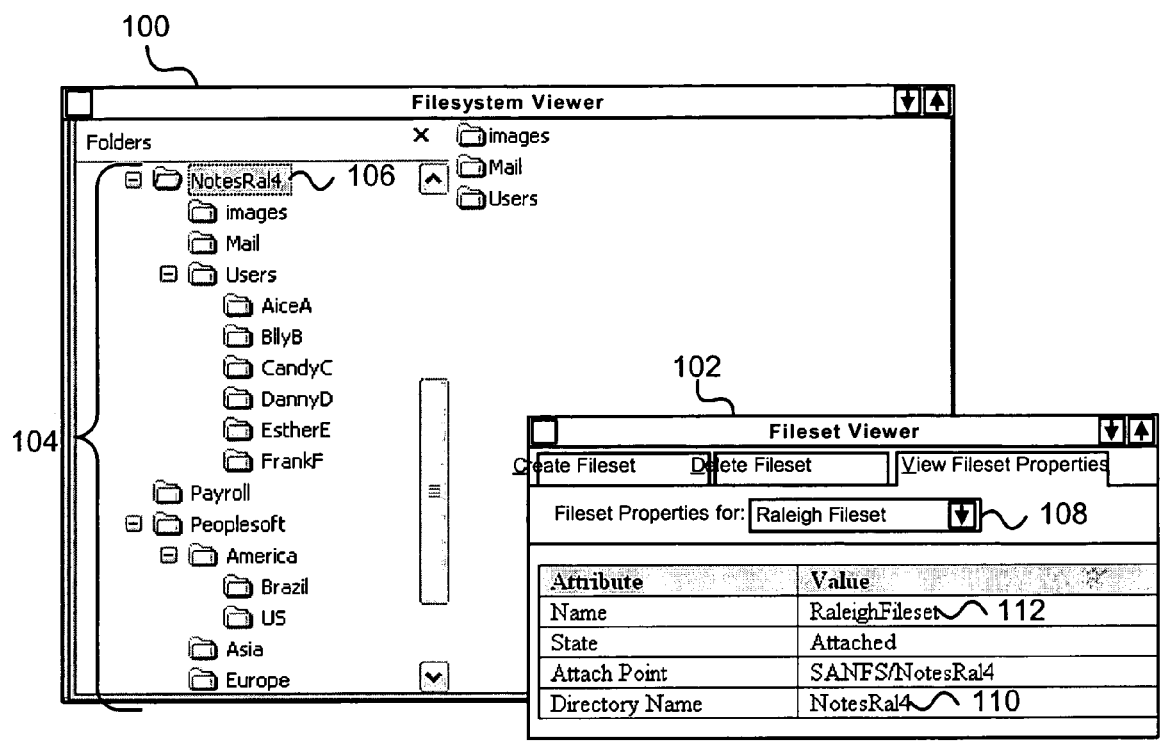
FIG. 1 is a graphical user interface illustrating a conventional method for presenting a mapping between file system components and a group of filesets.

It will be readily understood that the components of embodiments of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the embodiments of the invention can be practiced without one or more of the specific details, or with other methods, components, materials, etc. In other instances, well-known structures, materials, or operations are not shown or described in detail to avoid obscuring aspects of the various embodiments.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A SAN file system comprises at least one host coupled to at least one storage device through a Storage Area Network (SAN). The storage devices coupled to the SAN are pooled together to provide what appears to users and user applications as a single large virtual storage device. For example, a SAN file system comprising three hard drives, each with a capacity of forty gigabytes, appears as a single virtual storage device with a capacity of one hundred and twenty gigabytes.

Typically, the SAN file system organizes the virtual storage device into hierarchical directories so that hosts may efficiently use the virtual storage device. Each directory may contain a plurality of files, sub-directories, and links. The files, directories, and links that comprise the SAN file system are known as the components 104 of the SAN file system.

A SAN file system is one example of a namespace. Each name in the namespace may comprise a concatenation of a component name and a path that uniquely identifies the component 104 within the namespace. For example, one name within the namespace could be "/corporationx/seattle/finance/reports/spreadsheet.xyz" where "/corporationx/seattle/finance/reports/" is the path portion of the name and "spreadsheet.xyz" is the component name (a file name in this example).

In this manner, a unique name may be determined for each directory, file, and link located on the virtual storage device. The collection of names comprises a namespace. Each name within the namespace is unique. The scope of access to a namespace may range from local, to regional, to global. A global namespace provides a single common interface to the components of the global namespace for all users of the file system.

It may be advantageous to divide the virtual storage device into a set of logical segments to facilitate management and operation of the virtual storage device. As used herein, such logical segments are referred to as filesets. Those of skill in the art will recognize that other names such as partitions, segments, quota trees, metadata trees, or containers could be used for the logical segments in place of the term filesets. Typically, the SAN file system assigns each fileset a storage quota. The quota defines a maximum amount of space within the virtual storage device for the fileset.

End users of the SAN file system may create files and directories within the fileset as long as the storage quota has not been exceeded. Once the files and directories associated with the fileset consume the amount of storage space designated by the quota, no additional files or directories may be added to the fileset. Filesets are one example of a computing resource.

Figure 2:
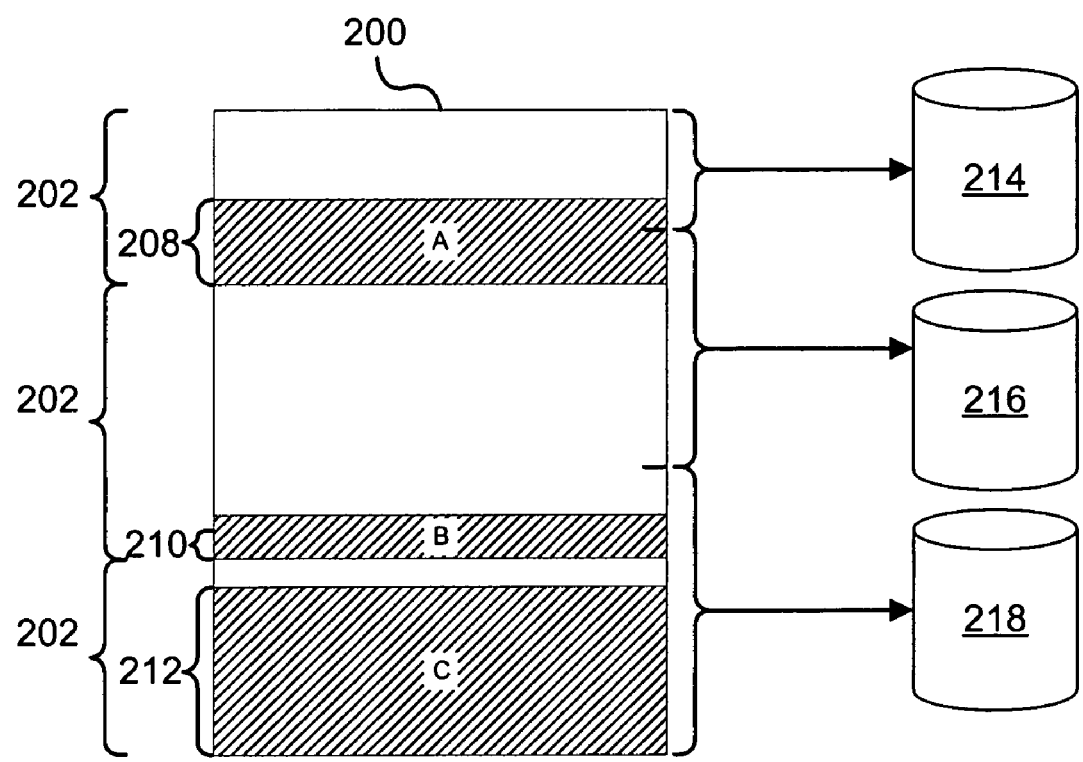
FIG. 2 is a block diagram illustrating one example of segmenting a virtual storage device into filesets.

FIG. 2 illustrates a logical view of a virtual storage device 200. The virtual storage device 200 is segmented into three filesets 202. The vertical height of each fileset 202 in FIG. 2 represents the storage quota assigned to the fileset 202. In this example, the middle fileset 202 is assigned the largest quota. FIG. 2 also illustrates the amount of storage space consumed by each fileset 202. Shaded area A 208 represents an amount of storage space consumed by the components 104 of the top fileset 202.

Similarly, shaded area B 210 represents the amount of storage space consumed by the middle fileset 202 and shaded area C 212 represents the amount of storage space consumed by the bottom fileset 202. Of the three depicted filesets 202, the bottom fileset 202 has consumed the largest percentage of its storage quota. The middle fileset 202 has consumed the smallest percentage of its quota.

As used herein, the term network administrator may refer to a storage administrator, network administrator, technician, or other person responsible for the configuration and operation of the SAN file system. A network administrator may use filesets 202 to segment users of a SAN file system into groups. For example, the network administrator may assign users from a finance department to the top fileset 202 and users from an engineering department to the middle fileset 202. The network administrator may configure filesets 202 so that the SAN file system prevents engineering users from accessing the files and directories associated with the top fileset 202. Similarly, the SAN file system may prevent a finance user from accessing the files and directories of the middle fileset 202. Segregating in this manner provides a degree of security within the SAN file system.

Assigning a storage quota to each fileset 202 prevents a fileset 202 from consuming substantially all of the available space of the virtual storage device 200. Quotas are especially important for SAN file systems since the virtual storage device 200 represents substantially all of the storage capacity of the network.

For example, an engineering user could be testing a new software product that relies on a database stored in a set of files assigned to the middle fileset 202. If for some reason a defect exists in the new software that repeatedly creates entries in the database, the files containing the database would rapidly increase in size. Eventually the new software product would not be able to create additional database entries because the middle fileset 202 would reach its assigned storage quota. The new software product defect does not affect finance users since finance users are assigned to the top fileset 202. The software defect is contained to the middle fileset 202 and is unable to access the storage space assigned to the top fileset 202.

The virtual storage device 200 is made up of a plurality of physical storage devices. FIG. 2 depicts a virtual storage device 200 comprising three physical storage devices 214, 216,218. The filesets 202 associated with the virtual storage device 200 do not necessarily correspond to a physical storage device 214,216,218.

For example, the middle fileset 202 is partially stored on the second storage device 216 and third storage device 218. Similarly, the third storage device 218 contains files and directories from the middle and bottom filesets 202. The first storage device 214 contains files and directories from the top fileset 202.

Figure 3A:
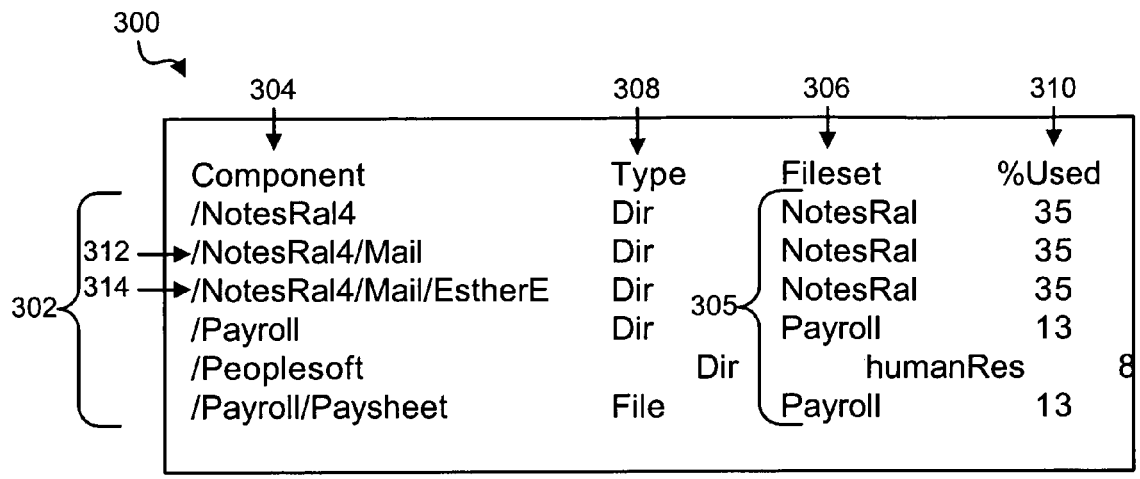
FIG. 3A is a chart illustrating one example of a mapping between file system components and a group of filesets.

FIG. 3A depicts one embodiment of a mapping 300 between namespace identifiers 302 for components 304 of a SAN file system and a set of computing resources 305. The set of computing resources 305 comprises a group of filesets 306. The mapping 300 may include other information associated with each component 304. For example, the mapping 300 may include the type 308 of component. The type 308 of component may be a file, a directory, or a link.

The mapping 300 may include other information associated with each fileset 306. For example, the mapping 300 may include statistical information 310. In the depicted mapping 300, the statistical information 310 comprises usage information for the fileset 306. The usage information indicates what percentage of the quota for a fileset 306 has been used.

Each namespace identifier 302 is associated with one fileset 306. For example, the namespace identifier "Mail" 312 is associated with fileset "NotesRal." The namespace identifier "EstherE" 314 is also associated with fileset "NotesRal." As illustrated, the mapping 300 may be a many-to-one mapping wherein many namespace identifiers 302 are mapped to a single fileset 306.

Figure 3B:
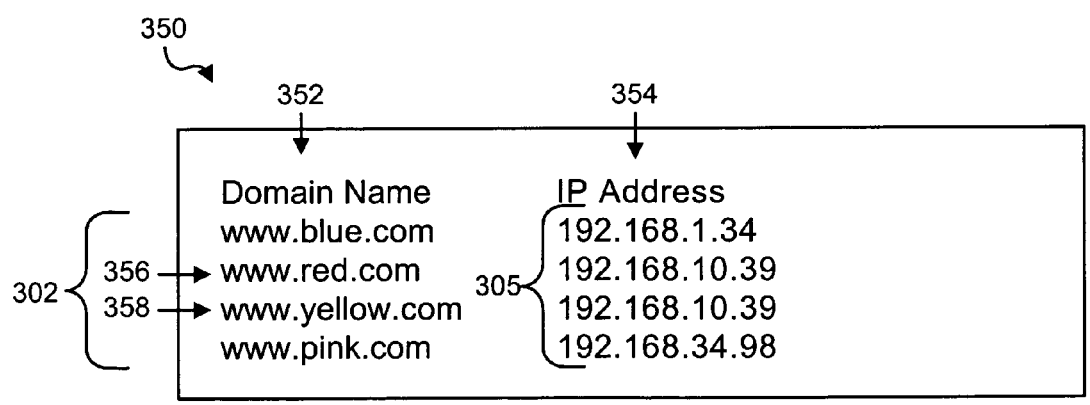
FIG. 3B is a chart illustrating one example of a mapping between domain names and Internet Protocol (IP) addresses.

FIG. 3B depicts a mapping 350 between namespace identifiers 302 and computing resource 305. The mapping 350 associates domain names 352 with IP addresses 354. In the mapping 350, a domain name "www.red.com" 356 is mapped to an IP address "192.168.10.39." A second domain name, "www.yellow.com" 358 is also mapped to IP address "192.168.10.39." The mapping 350 may be a many to one mapping 350 wherein many domain names 352 are mapped to a single IP address 354. Of course, other mappings may exist that map a namespace to a set of computing resources 305.

Figure 4:
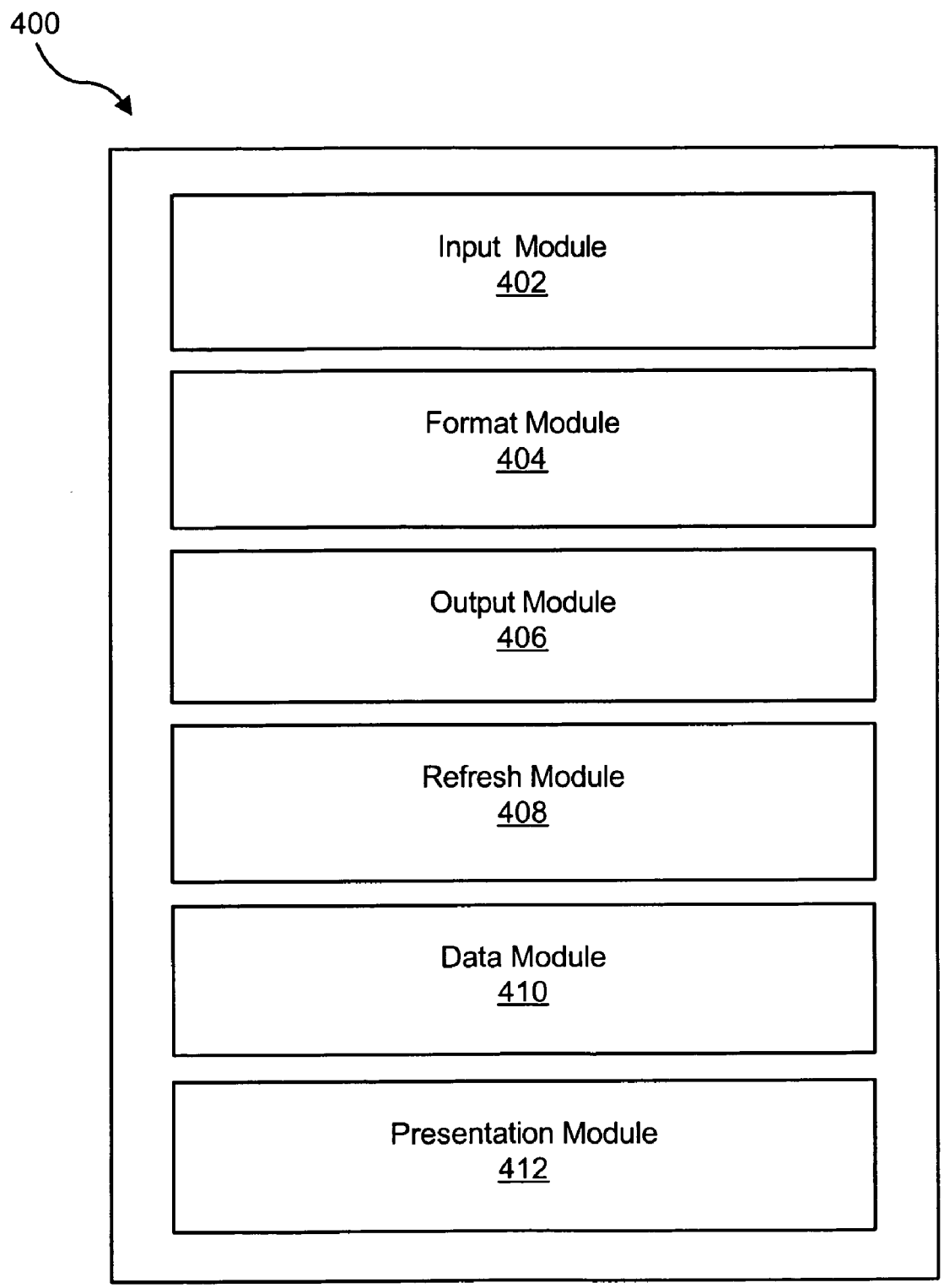
FIG. 4 is a schematic block diagram illustrating one embodiment of an apparatus for presenting a mapping between a namespace and a set of computing resources.

FIG. 4 illustrates an apparatus 400 for presenting a mapping between a namespace and a set of computing resources 305. The apparatus 400 includes an input module 402, a format module 404, and an output module 406. The apparatus 400 may optionally include a refresh module 408, a data module 410, and a presentation module 412.

The present invention operates with mappings between namespace identifiers 302 and a set of computing resources 305. The input module 402 obtains a mapping between namespace identifiers 302 and a set of computing resources 305. The mapping indicates which computing resource 305 is associated with each namespace identifier 302. One example of a namespace is a Storage Area Network (SAN) file system. An example of a computing resource 305 is a fileset.

The input module 402, may obtain a mapping 300 from another apparatus or system. For example, a file system may communicate a mapping to the input module 402. The input module 402 may obtain the mapping 300 by reading an electronic file containing the mapping 300, receiving a software function call, receiving a software signal, monitoring for a software event, or other techniques. Such techniques are well known to those of skill in the art. The input module 402 provides the mapping 300 to the format module 404.

The format module 404 associates a namespace identifier 302 and a computing resource 305 according to the mapping 300. The mapping 300 obtained by the input module 402 may be in an undesirable format. For example, the mapping 300 may be stored in a file instead of in a desired memory structure. Furthermore, the mapping 300 may contain additional information not required by the format module 404.

The format module 404 may take the mapping 300 and format the mapping 300 into a desired format. The desired format may comprise tags, links, or other identifiers that associate each namespace identifier 302 with a computing resource 305. The desired format may also include organizing the namespace identifiers 302 and associated computing resources 305 into a hierarchical structure such as a tree.

The format module 404 may create a memory structure such as a tree, an array, linked list, object, database, or the like. The format module 404 may then store the formatted mapping 300 in the memory structure. The memory structure may be stored in physical memory comprised of integrated circuits, a magnetic hard drive, or other volatile or non-volatile storage device.

The output module 406 provides the formatted namespace identifiers 302 and associated computing resources 305 to another system. The system may comprise operation support system software, system management software, or other monitoring software. The system may display the association between the namespace identifiers 302 and the computing resources 305 according to the formatting provided by the format module 404.

Preferably, the system displays the namespace identifiers 302 and associated computing resources 305 side by side on a computer monitor so that a user may visually observe the association between a namespace identifier 302 and a computing resource 305. For example, the namespace identifier 302 could be displayed on a row and the corresponding computing resource 305 displayed on the same row.

In one embodiment, the output module 406 may send the formatted namespace identifiers 302 and associated computing resources 305 to another system in response to a request from the other system. The other system may comprise a file system, a GUI, a web browser, or the like. In one embodiment, the output module 406 may provide the formatted information in the form of a data stream, file, markup language file, function call response, or other form. For example, the output module 406 may comprise a web service that supplies a stream of formatted information to a web browser. The web browser displays the formatted information for a network administrator. The output module 406 may also display the formatted information directly on a computer monitor.

Preferably, a data module 410 compiles statistical information 310 for each computing resource 305. The type of statistical information 310 compiled depends on computing resource 305 being used. The data module 410 may obtain the statistical information 310 from the mapping 300 or from another source such as an electronic file, a software function call, a software signal, a software event, or other source. The output module 406 may send the compiled statistical information 310 to another system or may display the compiled statistical information 310 directly on a computer monitor.

For example, if the computing resource 305 is a group of filesets 202, statistical information 310 for a fileset 202 may include the number of files in the fileset 202, the amount of space consumed by the fileset 202, the quality of service provided by the storage device on which the fileset 202 is stored, or other statistical information. If the computing resource 305 is a group of IP addresses 354, statistical information 310 for an IP address 354 may include a status of the IP address 354 (active or inactive), a hardware identifier for a server on which the IP address 354 is located, the number of web sessions established with the IP address 354, or other statistical information.

The apparatus 400 preferably includes a refresh module 408 that updates the provided namespace identifiers 302 and corresponding computing resources 305 in response to changes made to the mapping 300. The refresh module 408 monitors the mapping 300 for changes. When the mapping 300 changes, the refresh module 408 notifies the input module 402. The input module 402 then obtains the updated mapping 300. The format module 404 formats the updated mapping 300 and provides the updated mapping 300 to the output module 406.

The mapping 300 may change for several reasons. For example, in the case of a SAN file system, creating a new file, changing the name of a directory, or deleting a directory all result in a change to the mapping 300. Similarly, adding a new fileset 202, or changing the name of an existing fileset 202 results in a change to the mapping 300.

The refresh module 408 may detect a new mapping 300 by monitoring an electronic file containing the mapping 300, receiving a software function call, receiving a software signal, monitoring for a software event, or other techniques. Such techniques are well known to those of skill in the art.

A network administrator may use the apparatus 400 described above in troubleshooting a storage system. The ability to easily determine the mapping 300 of a namespace to a set of computing resources 305 minimizes the amount of time a network administrator spends troubleshooting by reducing the number of steps required to determine the mapping 300. The apparatus 400 may be useful in troubleshooting SAN file systems and domain name servers, as described above. In addition, the apparatus 400 may benefit other networks and systems.

A further embodiment of the apparatus 400 presents a mapping 300 of a file system to a group of filesets 202. The apparatus includes an input module 402, a presentation module 412, and a refresh module 408. The presentation module 412 simultaneously presents the components 104 of the file system and the fileset 202 corresponding to each component 104. Preferably, the presentation module 412 presents the components 104 of the file system in a first tree control and the filesets 202 in a second tree control. The first tree control and second tree control may enable a user to expand or collapse a branch of either the first tree control or the second tree control. In response to expanding or collapsing a branch of either tree control, the presentation module 412 may correspondingly update both the first tree control and the second tree control. Preferably, the presentation module 412 displays the statistical information 310 compiled by the data module 410.

In one embodiment, the apparatus 400 presents a mapping 300 of filesets 204 to storage volumes. Storage volumes are portions of a storage device 706 on which a fileset 204, or a portion of a fileset 204, is physically stored. A network administrator may need to know which storage volume a particular file is located on to resolve an issue. For example, if a user reports to the network administrator that a file has become corrupted, the network administrator may use the apparatus 400 to determine which storage device 706 the file resides on.

The network administrator may accomplish this by first determining which fileset 202 the file is associated with. Next, the network administrator determines which storage volume the fileset 202 is located on. Then the network administrator determines which storage device 706 contains the identified storage volume. The network administrator may then test the identified storage device 706 to determine if there is anything wrong with the storage device 706. For example, the network administrator may execute diagnostic tests on the storage device 706.

To present a mapping 300 of filesets 202 to storage volumes the input module 402 obtains a second mapping between each fileset 202 and a set of storage volumes. The input module 402 obtains the second mapping in substantially the same manner as the first mapping 300 is obtained. The presentation module 412 simultaneously presents each fileset 202 and the set of storage volumes corresponding to each fileset 202. The presentation module 412 may use a third tree control to present the storage volumes. The presentation module 412 presents the third tree control along with the first tree control 604 for the file system and the second tree control 606 for the filesets 202.

The refresh module 408 updates the presentation of the fileset 202 and corresponding set of storage volumes in response to changes made to the second mapping. The refresh module 408 detects changes to the second mapping in substantially the same manner as changes to the first mapping 300 are detected.

The apparatus 400 minimizes time spent by a network administrator in troubleshooting the storage system by presenting a mapping between a file and the storage volume on which the file resides. For example, a user may request that a particular file be protected by disk redundancy. The network administrator may use the apparatus 400 to determine if the particular file is located on storage volumes that have disk redundancy. If the storage volumes do not include disk redundancy, action may be taken by the network administrator to remedy the situation.

Figure 5A:
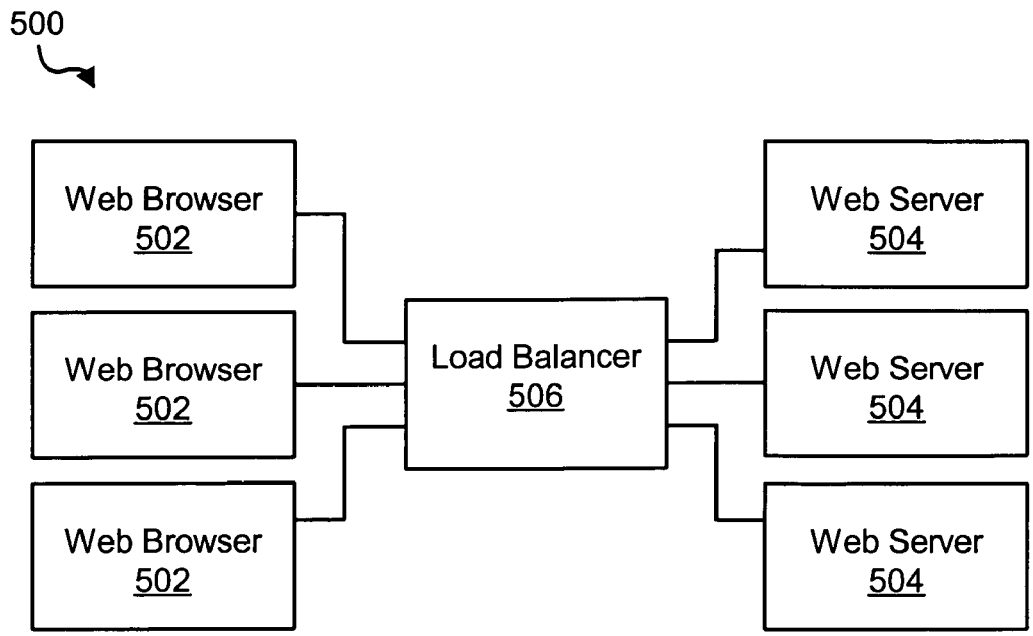
FIG. 5A is a schematic block diagram illustrating one embodiment of a system for web server load balancing.

FIG. 5A illustrates a system 500 for load balancing a web server. A plurality of web browsers 502 each access a particular web site. Instead of hosting the web site on a single web server 504, a plurality of substantially identical web servers 504 host the web site. The plurality of web servers 504 increase the number of web browsers 502 that may simultaneously have access to the web site. A load balancer 506 receives requests from the web browsers 502 to access the web site. The load balancer 506 assigns a session ID to each web browser 502.

Figure 5B:
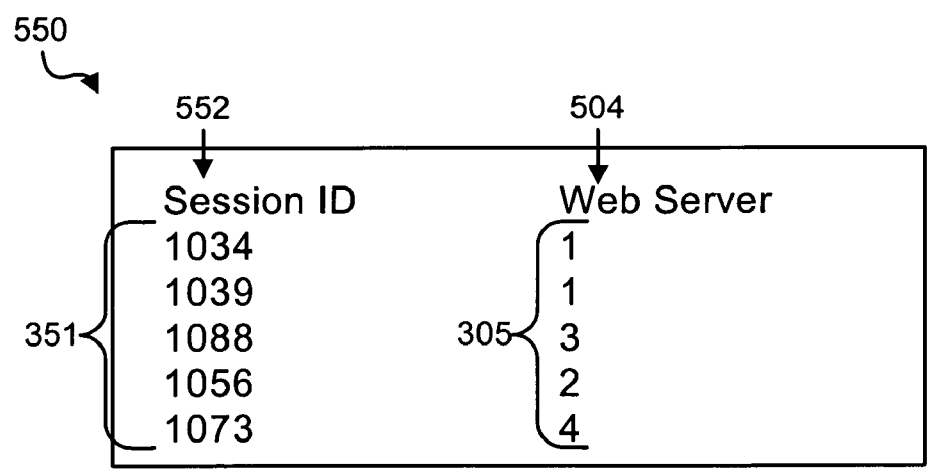
FIG. 5B is a chart illustrating one embodiment of a mapping between session identifiers and web servers.

Based on the session ID, the load balancer 506 allows the web browser 502 to access a particular web server 504. The load balancer 506 distributes sessions across substantially all of the web servers 504 so that the web servers 504 are substantially equally loaded. A network administrator for the system 500 may use one embodiment of the apparatus 400 for presenting a mapping 300 between session identifiers, an example of a namespace, and a web server 504, an example of a computing resource 305. FIG. 5B illustrates a mapping 550 between session identifiers 552 and web servers 504.

In another embodiment of the apparatus 400, the namespace comprises a file system and the set of computing resources 305 comprise database retrievals. The input module 402 obtains a mapping that maps a file of the file system to a database query. The file system dynamically creates the files of the file system in response to a user request to access the file. To create the file, the file system performs one or more database queries and places the results of the queries in the files. The queries are performed each time a user requests access to the file.

The apparatus 400 minimizes time spent by a network administrator in troubleshooting the network by presenting a mapping between a file and the queries that generate the file. For example, if the contents of a file are unexpected or incorrect, the network administrator may use the apparatus 400 to quickly view the database queries that create the file. The network administrator may then verify that the database queries are written correctly and are returning correct information.

In yet another embodiment of the apparatus 400, the namespace comprises a SAN file system and the set of computing resources 305 comprises storage volumes. The input module 402 obtains a mapping that maps a file of the file system to a storage volume. A storage volume may comprise a storage device such as a disk, tape, disk array, integrated circuits, or other non-volatile storage. Since a SAN file system appears as a single virtual storage device 200, the user of a SAN file system is typically unaware of the storage volumes on which a particular file resides.

Figure 6:
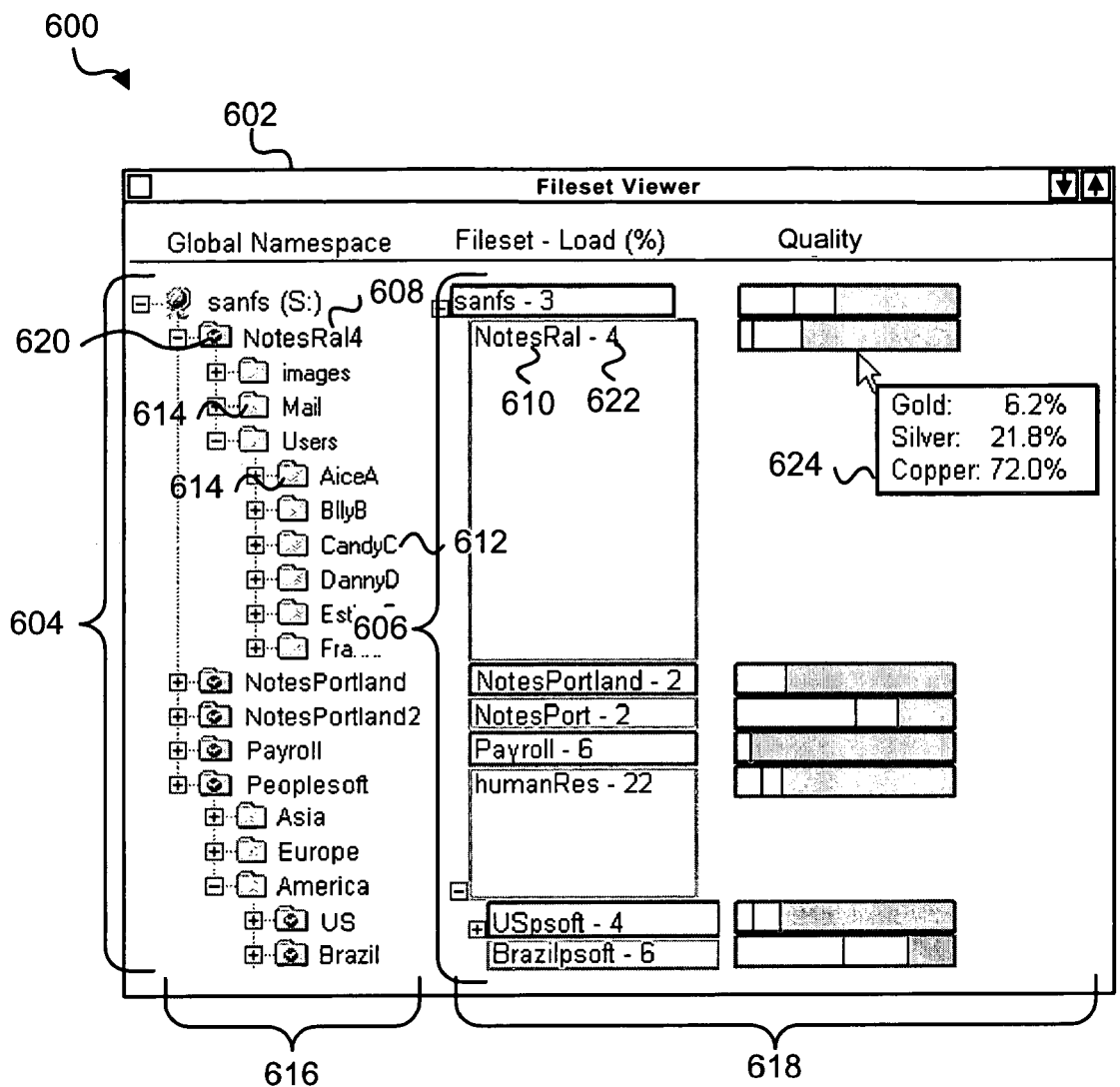
FIG. 6 is a graphical user interface illustrating one embodiment of GUI for presenting a mapping of a file system to a group of filesets.

FIG. 6 illustrates a GUI 600 for presenting a mapping 300 of a file system to a group of filesets 202. The GUI 600 includes an input module 402 (See FIG. 4) that obtains a mapping between components 104 (See FIG. 1) of a file system and a group of filesets 202 (See FIG. 2) in substantially the same manner as described above in relation to FIG. 4. The GUI 600 includes a window 602 that simultaneously displays components 104 of a file system and corresponding filesets 202. Preferably, the window 602 comprises a file system pane 616 side by side with a fileset pane 618. The file system pane 616 includes a first tree control 604 that displays the components 104 of the file system represented respectively by folder or file icons.

The fileset pane 618 includes a second tree control 606 that displays the fileset 202 corresponding to each component 104 in the first tree control 604. The filesets 202 may be represented by labeled rectangle icons. Of course, various other types of graphics or icons may be used. The GUI 600 displays the file system components 104 and filesets 202 side by side to enable a network administrator to quickly determine the fileset 202 associated with each component 104 of the file system.

For example, a network administrator may observe that the "NotesRal4" directory 608 is associated with the "NotesRal" fileset 610 by locating the "NotesRal4" directory 608 in the first tree control 604. The association is intuitively communicated by positioning a component and its associated fileset 202 on the same horizontal row. The network administrator then looks to the right of the "NotesRal4" directory 608 to locate the name of the fileset located horizontally to the right of the "NotesRal4" directory 608, in this example the "NotesRal" fileset 610.

Similarly, a network administrator may determine that the "CandyC" directory 612 is associated with the "NotesRal" fileset 610 by locating the "CandyC" directory 612 in the first tree control 604. The network administrator then looks to the right of the "CandyC" directory 612 to locate the name of the fileset located horizontally to the right of the "CandyC" directory 612. In this example, the label of the fileset is not located directly to the right of the "CandyC" directory 612, but the user may observe that the area to the right of the "CandyC" directory 612 is in a box labeled as the "NotesRal4" fileset 610.

Note that more than one directory may be associated with a single fileset 202. For example, the "Peoplesoft," "Asia," "Europe," and "America" directories are associated with the "humanRes" fileset. Preferably, branch icons 614 of the first tree control 604 represent directories of the file system.

Similar to directories, filesets 202 may be nested. For example, in FIG. 6 the "USpsoft" fileset is nested within the "humanRes" fileset. Nesting is illustrated by shifting or indenting a descendant node to the right. Each fileset 202 has an attach point in the file system. An attach point represents how a fileset 202 relates to the remainder of the hierarchical file system. The attach point is the directory closest to the root directory of the file system that is associated with the fileset 202. For example, in FIG. 6 the "Peoplesoft" directory is the attach point for the "humanRes" fileset.

Preferably, the GUI 600 updates the file system pane 616 in response to user input in either the file system pane 616 or the fileset pane 618. User input may comprise the creation of a new directory, file, or fileset 202. User input may also comprise the selection of a branch icon 614 or leaf icon of the first tree control 604, single or double clicking on a branch icon 614 or leaf icon, expanding a branch of the first tree control 604, collapsing a branch of the first tree control 604, or other common user input.

In response to user input, the GUI 600 may update the display in the file system pane 616. For example, if a user expands a branch of the first tree control 604 by clicking on the "+" icon next to the branch icon 614, the first tree control 604 responds by expanding the tree and displaying the subdirectories and files located in the directory adjacent to the "+" icon that was clicked. The fileset pane 618 may also respond by expanding the second tree control 606 to display the filesets 202 in a branch corresponding to the new directories and files exposed in the first tree control 604.

Similarly, in response to user input, a GUI 600 may update the display in the fileset pane 618. For example, if a user expands a branch of the second tree control 606 by clicking on the "+" icon next to the branch icon 614, the second tree control 606 responds by expanding the tree and displaying the filesets 202 nested below the fileset 202 corresponding to the "+" icon that was clicked. The file system pane 616 may also respond by expanding a corresponding branch of the first tree control 604 to display each of the directories that are attach points for the nested filesets 202 newly exposed in the second tree control 606.

Another example of user input is collapsing a branch of a tree control 604,606. If a user collapses a branch of the first tree control 604 by clicking on the "−" icon next to the branch icon 614, the first tree control 604 responds by collapsing the tree and hiding the directories and files located in the directory corresponding to the "−" icon that was clicked. The fileset pane 618 may also respond by collapsing a corresponding branch of the second tree control 606 to hide the filesets 202 corresponding to the directories and files hidden in the first tree control 604.

Similarly, if a user collapses a branch of the second tree control 606 by clicking on the "−" icon next to the branch icon 614, the second tree control 606 responds by collapsing the tree and hiding the filesets 202 nested below the fileset 202 corresponding to the "−" icon that was clicked. The file system pane 616 may also respond by collapsing a corresponding branch of the first tree control 604 to hide each of the directories that are attach points for the nested filesets 202 hidden in the second tree control 606.

Preferably, the GUI 600 highlights the branch icons 614 of the first tree control 604 that are fileset attach points. The GUI 600 may highlight the branch icon 614 by using a different icon, color, shading, or other method known to those of skill in the art. For example, in FIG. 6 the "NotesRal4" directory 608, an attach point, has a different branch icon 620 than the "images" directory which is not an attach point. In this manner, the file system pane 616 readily communicates the position of attach points.

The GUI 600 further comprises a refresh module 408 that updates the display of the components 104 of the file system and the corresponding filesets 202 in response to changes made to the mapping 300. The refresh module 408 monitors the mapping 300 in substantially the same manner as described above in relation to FIG. 4.

The mapping 300 may change for several reasons. For example, creating a new file, changing the name of a directory, or deleting a directory may all result in a change to the mapping 300. Similarly, adding a new fileset 202, or changing the name of an existing fileset 202 results in a change to the mapping 300.

The refresh module 408 may monitor the mapping 300 for changes. In addition, the refresh module 408 may make changes to the mapping 300 based on user input. For example, if a user adds a new fileset 202 using the window 602, the refresh module 408 will update the mapping 300 to reflect the addition of a new fileset 202.

In one embodiment, the fileset pane 618 displays statistical information 310 related to each fileset 202. For example, the fileset pane 618 may display a percentage 622 of the storage space quota used by a fileset 202. In the depicted GUI 600, four percent of the storage quota assigned to the "NotesRal" fileset 610 has been consumed. The refresh module 408 may update the percentage 622 so that the percentage 622 displayed remains correct as additional files are added to or deleted from the fileset 202.

The fileset pane 618 may also display the quality 624 of the storage volumes on which parts of the filesets 202 are physically located. In the depicted GUI 600, the "NotesRal" fileset 610 is stored in storage volumes, of which 6.2% are of gold quality, 21.8% are of silver quality, and 72% are of copper quality. Factors that contribute to the quality rating of a storage volume may include the frequency with which back-ups are performed, whether or not the storage volume has an off-site backup, whether or not the storage volume is on a redundant disk array, access speed, and other factors.

In one embodiment of the GUI 600, an additional pane is added to the window 602 that displays the name of the storage volumes corresponding to each fileset 202. Such an embodiment may enable a network administrator to quickly locate both the fileset 202 and storage volumes associated with a particular component 104 of the file system.

Figure 7:
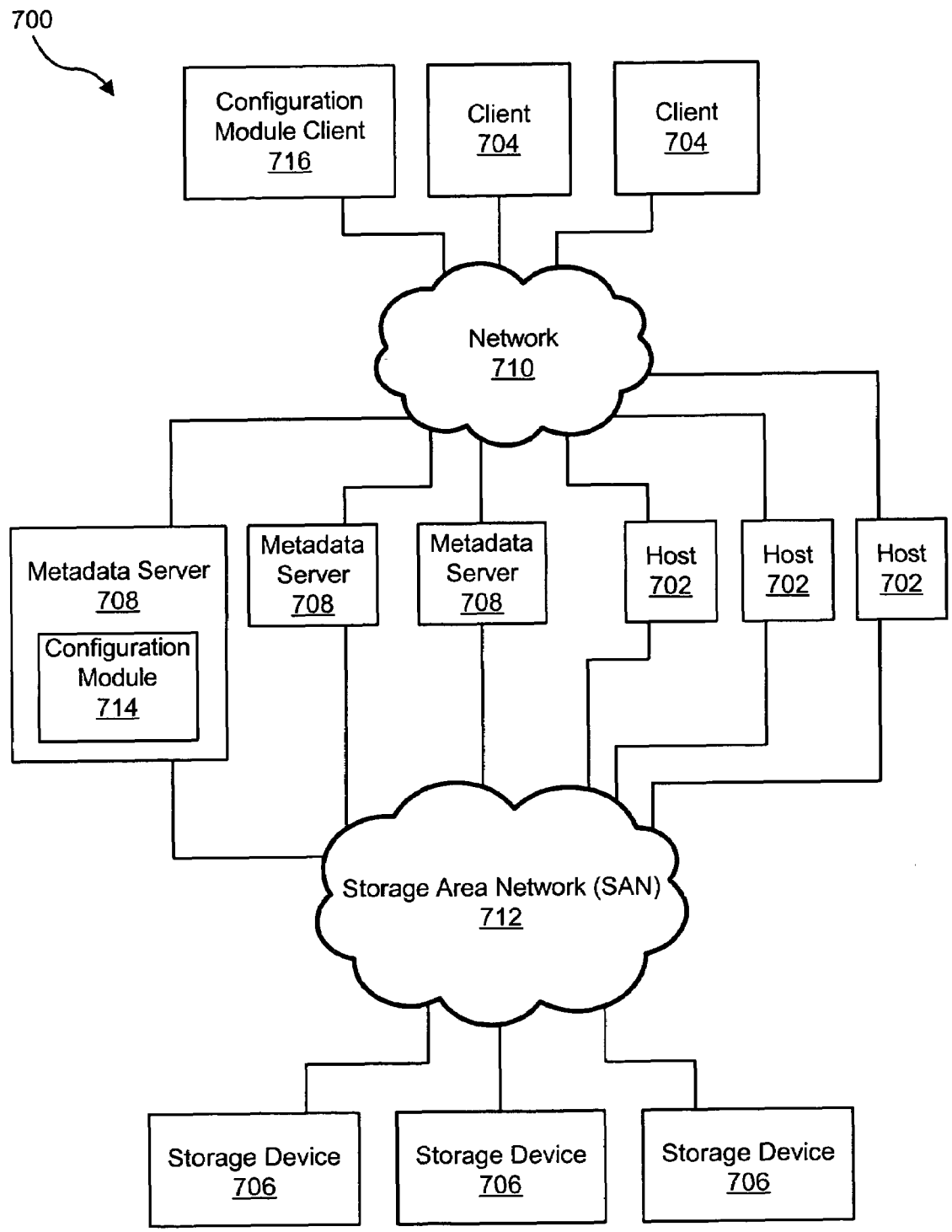
FIG. 7 is a schematic block diagram illustrating one embodiment of a system for presenting a mapping of a file system to a group of filesets.

FIG. 7 illustrates a system 700 for presenting a mapping 300 (See FIG. 3) of a file system to a group of filesets 202 (See FIG. 2). The system 700 includes a host 702, a client 704, a storage device 706, a metadata server 708, a network 710, and a Storage Area Network (SAN) 712.

The host 702 utilizes components 104 of a SAN file system. The host 702 may create, delete, read, or edit the components 104 of the SAN file system. Additionally, the host 702 may provide software applications to a client 704. The system 700 may comprise a plurality of hosts 702 and a plurality of clients 704. The clients 704 communicate with the hosts 702 to perform a variety of tasks and are well known to those of skill in the art.

The storage device 706 stores components 104 of the file system in a group of filesets 202 located on one or more storage volumes. Each storage volume is located on a storage device 706 such as a tape drive, magnetic hard drive, array of hard drives, or the like. The system 700 may comprise a plurality of storage devices 706. The SAN file system aggregates the storage devices 706 into what appears to a host 702 to be a single virtual storage device 200 (See FIG. 2).

The metadata server 708 processes requests from hosts 702 to access the SAN file system. Hosts 702 may communicate with the metadata server 708 by sending a request to create, delete, read, or edit one of the files, directories, or links to the metadata server 708. The request is sent over a network 710. The metadata server 708 provides SAN file system control by ensuring that one host 702 has write access to a particular file at a time.

In addition, the metadata server 708 may maintain hierarchical information about the file system, such as the arrangement of files in directories and subdirectories. The metadata server 708 enforces permission properties of files by allowing file access to hosts 702 with proper permissions. The metadata server 708 maintains specific information about where each file is stored, such as the volume and storage device 706 the file resides on.

After receiving a request from a host 702, the metadata server 708 checks permissions, and if the host 702 has the correct permissions, the metadata server 708 provides the host 702 with an identifier for the storage device 706 and storage volume that the desired file resides on. The host 702 may then access the storage device 706 directly, through a Storage Area Network (SAN) 712.

To increase the number of file requests that a SAN file system may handle, the system 700 may include more than one metadata server 708. A configuration module 714 may reside on at least one of the metadata servers 708. The configuration module 714 includes an input module 402 (See FIG. 4), a presentation module 412, and a refresh module 408. The input module 402 obtains a mapping 300 between components 104 of the file system and the group of filesets 202.

The system 700 may also include a configuration module client 716. The presentation module 412 simultaneously presents the components 104 and the fileset 202 corresponding to each component 104 to the configuration module client 716. The refresh module 408 updates the presentation in response to changes made to the mapping 300.

The configuration module client 716 may comprise application software, a script, instructions for a web browser, or other software. A network administrator may use the configuration module client 716 in troubleshooting. Specifically, the network administrator may use the configuration module client 716 to view a mapping 300 of a file system to a group of filesets 202. The configuration module client 716 receives presentation information from the configuration module 714 and displays the information in a graphical user interface. The configuration module client 716 communicates with the configuration module 714 through the network 710.

Preferably, the configuration module client 716 displays the components 103 of the file system in a first tree control 604 side by side with the corresponding filesets 202 in a second tree control 606. Preferably, the tree controls 604,606 may be expanded and collapsed in substantially the same manner as described above in relation to FIG. 6. Optionally, the configuration module client 716 may highlight directories in the first tree control 604 that are fileset attach points in substantially the same manner as described above in relation to FIG. 6.

In one embodiment of the system 700, the configuration module client 716 displays statistical information 410 for each fileset 202 in substantially the same manner as described above in relation to FIG. 6. The configuration module client 716 updates the displayed mapping as the configuration module 713 provides updated information to the configuration module client 716.

The configuration module client 716 may reside on the metadata server on a host 702, or on another computer. More than one configuration module client 716 may communicate with a single configuration module 713.

The storage area network (SAN) 712 enables communication between the host 702, storage device 706, and metadata server 708. The SAN 712 may comprise optical or electrical interfaces, such as Fibre Channel or Ethernet, and switches that enable high speed transfer of data between a host 702 and a storage device 706. Preferably, the SAN 712 enables substantially any device connected to the SAN 712 to communicate with substantially any other device connected to the SAN 712.

Figure 8:
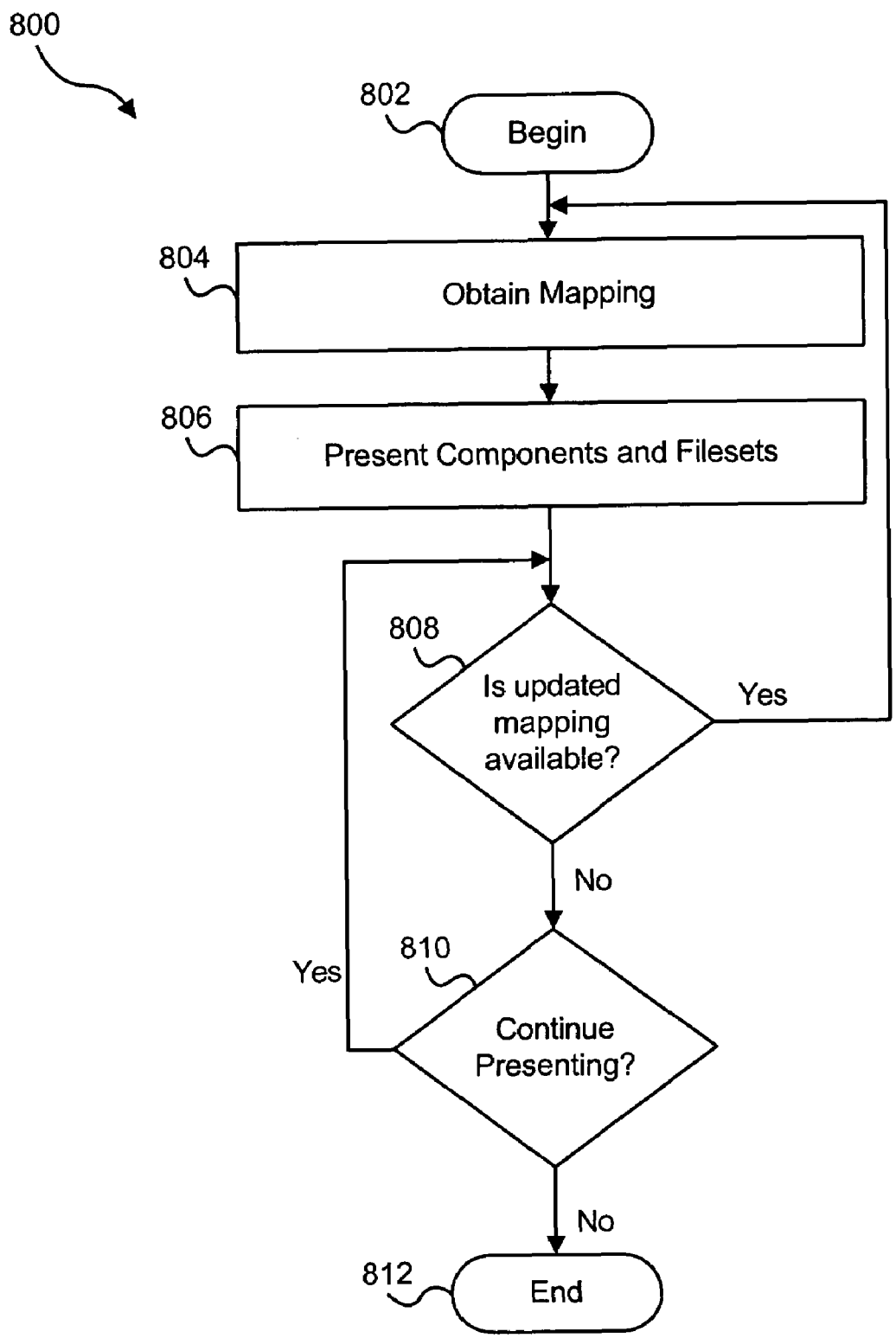
FIG. 8 is a schematic block diagram illustrating one embodiment of a set of operations for presenting a mapping of a file system to a group of filesets.

FIG. 8 illustrates a method 800 for presenting a mapping 300 of a file system to a group of filesets 202. The method 800 presented below may also be embodied as a program of machine-readable instructions. The method 800 begins 802 when an input module 402 obtains 804 a mapping 300 between components 104 of a file system and a group of filesets 202. The input module 402 obtains the mapping 300 in substantially the same manner as described above in relation to FIG. 4.

Next, a presentation module 412 presents 806 the components 104 of the file system and the fileset 202 corresponding to each component 104. Preferably, the presentation module 412 presents the components 104 and the corresponding filesets 202 side by side with the components 104 in a first tree control 604 and the filesets 202 in a second tree control 606. The tree control 604,606 operation is described above in relation to FIG. 6.

Next, a refresh module 408 determines 808 if an updated mapping 300 is available. If an updated mapping 300 is available, the refresh module 408 notifies the input module 402 and the input module 402 obtains 804 the updated mapping 300. If an updated mapping 300 is not available, the refresh module 408 determines 810 if the presentation module 412 should continue to present the mapping 300.

The refresh module 408 monitors for inputs from a user indicating that the user no longer desires to view the presentation of the mapping 300. For example, a user may decide to close a window 602, issue an exit command, or other action. If an input to discontinue the presentation is detected, the refresh module 408 discontinues the presentation (i.e. closes a window 602) and the method ends 812. Otherwise, the method 800 returns to step 808.

Figure 9:
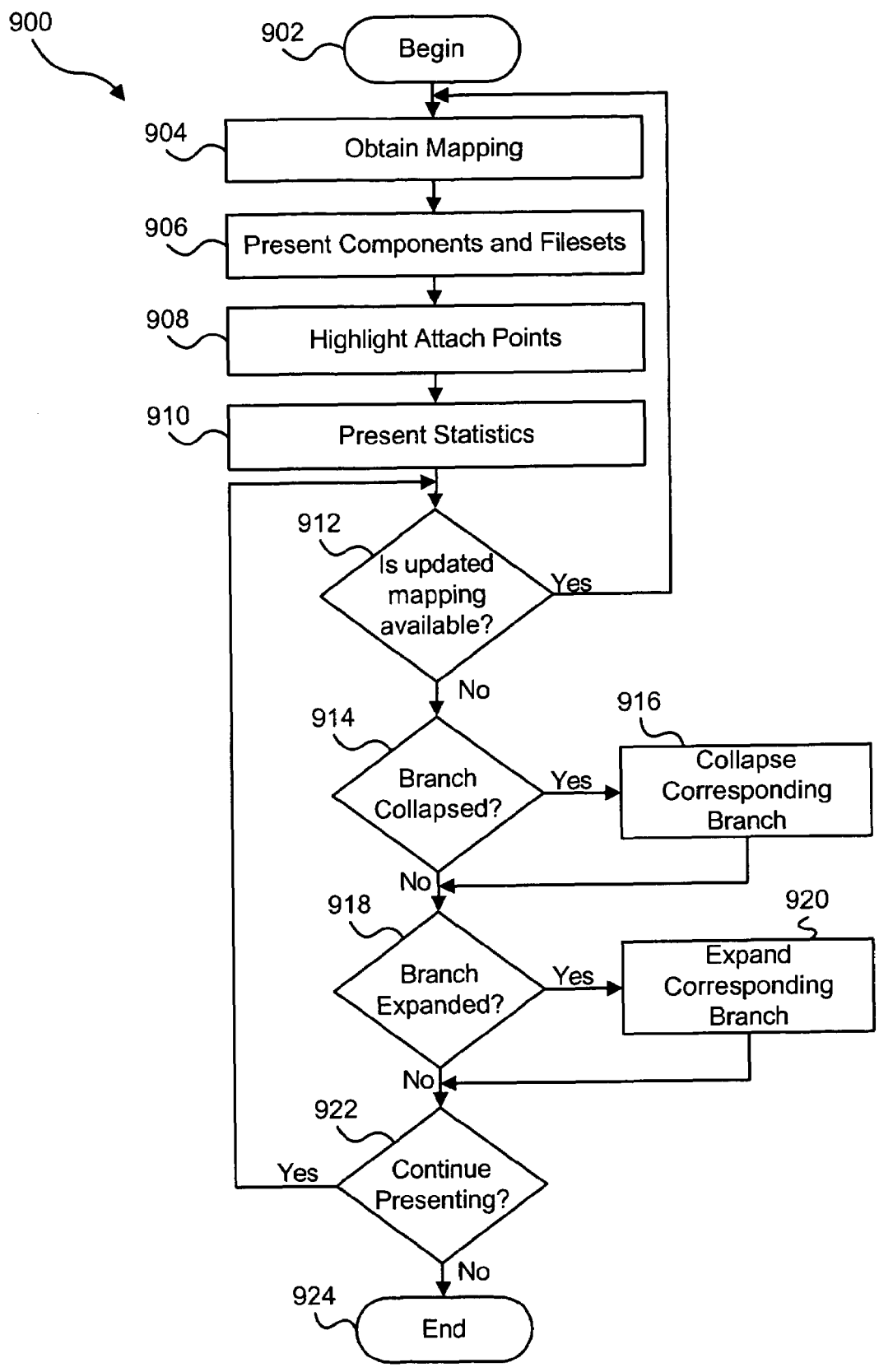
FIG. 9 is a schematic block diagram illustrating one embodiment of a detailed set of operations for presenting a mapping of a file system to a group of filesets.

FIG. 9 illustrates another embodiment of a method 900 for presenting a mapping 300 of a file system to a group of filesets 202. The method 900 presented below may also be embodied as a program of machine-readable instructions. The method 900 begins 902 when an input module 402 obtains 904 a mapping 300 between components 104 of a file system and a group of filesets 202. The input module 402 obtains the mapping 300 in substantially the same manner as described above in relation to FIG. 4.

Next, a presentation module 412 preferably presents 906 the components 104 of the file system and the fileset 202 corresponding to each component 104 side by side in adjacent tree controls 604,606. The presentation module 412 also highlights 908 the directories of the file system that are fileset 202 attach points. For example, branch icons 614 may be replaced with icons representing attach points. The presentation module 412 may present 910 the statistical information 310 compiled by the data module 410.

Next, a refresh module 408 may determine 912 if an updated mapping 300 is available. If an updated mapping 300 is available, the refresh module 408 notifies the input module 402 and the input module 402 obtains 904 the updated mapping 300.

If an updated mapping 300 is not available, the refresh module 408 determines 914 if a user input requesting that a branch of either the first tree control 604 or the second tree control 606 be collapsed has been received. If a request to collapse is received, the refresh module 408 collapses 916 the branch and collapses any corresponding branches of the first tree control 604 and second tree controls 606.

If a request to collapse was not received, the refresh module 408 determines 918 if a user input requesting expansion of a branch of either the first tree control 604 or the second tree control 606 has been received. If a request to expand is received, the refresh module 408 expands 920 the branch and expands any corresponding branches of the first tree control 604 and second tree control 606.

If a request to expand is not received, the refresh module 408 determines 922 if the presentation module 412 should continue to present the mapping 300 in substantially the same manner as described above in relation to FIG. 8. If an input to discontinue the presentation is detected, the refresh module 408 discontinues the presentation and the method 900 ends 924. Otherwise, the method 900 returns to step 912.

Figure 10:
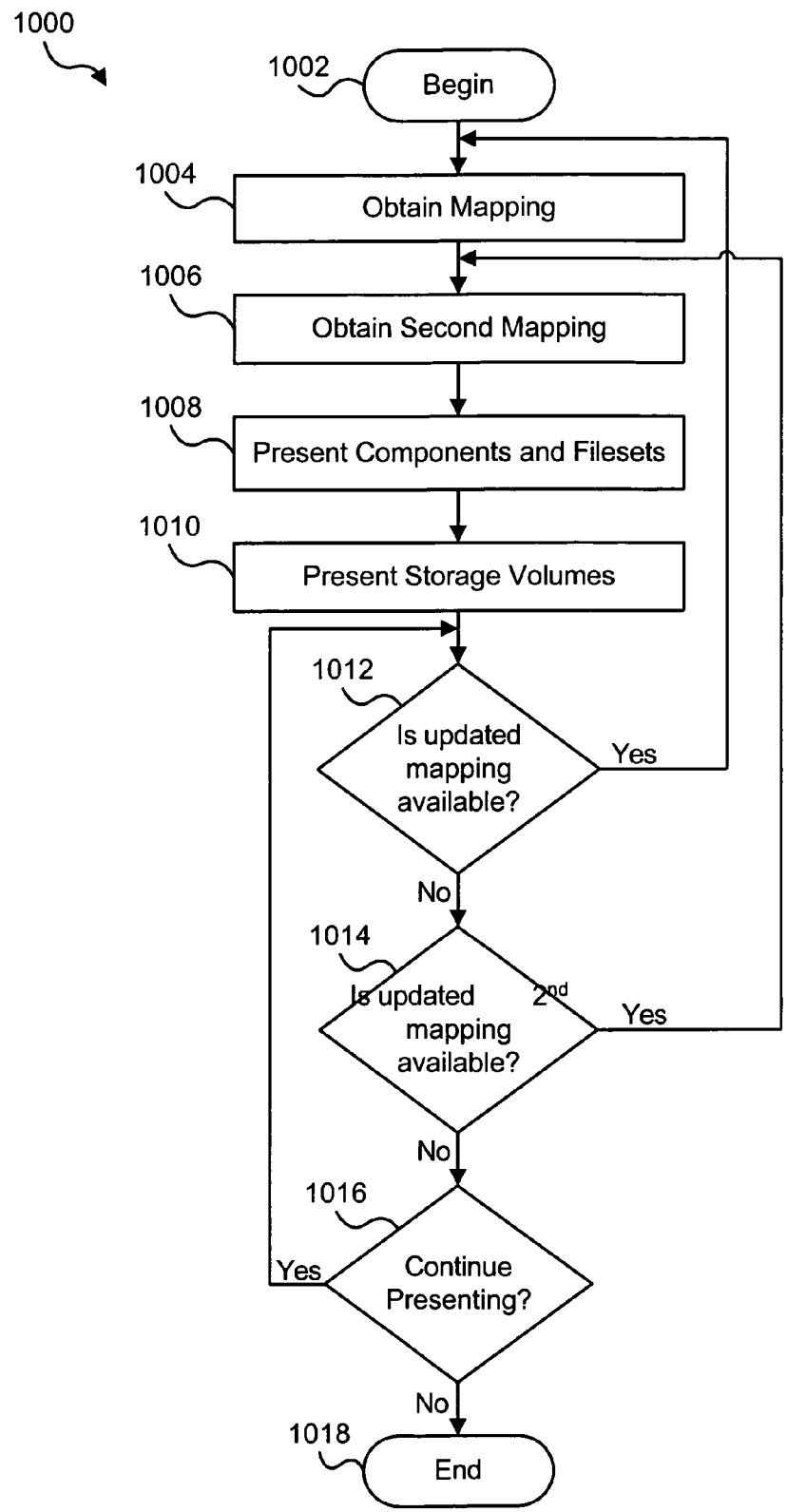
FIG. 10 is a schematic block diagram illustrating another embodiment of a set of operations for presenting a mapping of a file system to a group of filesets.

FIG. 10 illustrates another embodiment of a method 1000 for presenting a mapping 300 of a file system to a group of filesets 202. The method 1000 presented below may also be embodied as a program of machine-readable instructions. The method 1000 begins 1002 when an input module 402 obtains 1004 a mapping 300 between components 104 of a file system and a group of filesets 202. The input module 402 obtains the mapping 300 in substantially the same manner as described above in relation to FIG. 4.

Next, the input module 402 obtains 1006 a second mapping between filesets 202 and storage volumes. The input module 402 obtains the second mapping in substantially the same manner as the first mapping is obtained. The presentation module 412 presents 1008 the components 104 of the file system and the fileset 202 corresponding to each component 104 side by side using tree controls.

The presentation module 412 then presents 1010 the storage volumes corresponding to each fileset 202. Preferably, the presentation module 412 presents the corresponding storage volumes side by side with the filesets 202 in a third tree control. The presentation module 412 enables a network administrator to quickly determine which storage volumes store a particular fileset 202 or component 104. The third tree control expands and collapses in substantially the same manner as the first tree control 604 and second tree control 606 as described above in relation to FIG. 6.

Next, a refresh module 408 determines 1012 if an updated mapping 300 is available. If an updated mapping 300 is available, the refresh module 408 notifies the input module 402 and the input module 402 obtains 1004 the updated mapping 300. If an updated mapping 300 is not available, the refresh module 408 determines 1014 if an updated second mapping is available. The determination for the second mapping is made in substantially the same manner as the determination for the first mapping 300. If an updated second mapping is available, the refresh module 408 notifies the input module 402 and the input module 402 obtains 1006 the updated second mapping.

If an updated second mapping is not available, the refresh module 408 determines 1016 if the presentation module 412 should continue to present the mapping 300 in substantially the same manner as described above in relation to FIG. 8. If an input to discontinue the presentation is detected, the refresh module 408 discontinues the presentation and the method ends 1018. Otherwise, the method 1000 returns to step 1012.

The embodiments of the present invention may be embodied in other specific forms without departing from its spirit or essential characteristics. The described embodiments are to be considered in all respects only as illustrative and not restrictive. The scope of different embodiments of the invention is, therefore, indicated by the appended claims rather than by the foregoing description. All changes which come within the meaning and range of equivalency of the claims are to be embraced within their scope.

What is claimed is:

1. An apparatus for providing a mapping between a namespace and a set of computing resources, the apparatus comprising:
   an input module configured to obtain a mapping between namespace identifiers of a file system and a group of filesets of a virtual storage device, each fileset comprising a logical segmentation of the virtual storage device, the mapping associating each namespace identifier with a fileset;
   a data module configured to compile statistical information for each fileset;
   a format module configured to associate a namespace identifier and a fileset according to the mapping; and
   an output module configured to provide the namespace identifiers, the associated filesets corresponding to each namespace identifier, and the statistical information for each fileset and to simultaneously present the namespace identifiers, the corresponding fileset names, and the statistical information side by side within a single window such that each fileset name is visually associated with one or more namespace identifiers within the single window and each namespace identifier is visually associated with a corresponding fileset name within the single window.

2. The apparatus of claim 1, further comprising a refresh module configured to update the provided namespace identifiers and corresponding fileset names in response to changes made to the mapping.

3. The apparatus of claim 1, wherein the mapping comprises mapping at least one namespace identifier to one of the multiple filesets.

4. The apparatus of claim 1, wherein the virtual storage device comprises one or more storage volumes.

5. An apparatus for presenting a mapping of a file system to a group of filesets, the apparatus comprising:
   an input module configured to obtain a mapping between components of a file system and a group of filesets of a virtual storage device, each fileset comprising a logical segmentation of the virtual storage device, the mapping associating each component of the file system with a fileset;
   a data module configured to compile statistical information for each fileset;
   a presentation module configured to simultaneously present the components, a name of the fileset corresponding to each component, and the statistical information for each fileset side by side within a single window such that each name of a fileset is visually associated with one or more components within the single window and each component is visually associated with a corresponding name of a fileset within the single window; and
   a refresh module configured to update the presentation of the components and corresponding names of filesets in response to changes made to the mapping.

6. The apparatus of claim 5, wherein the components of the file system comprise links, directories, and files.

7. The apparatus of claim 5, wherein the presentation module is further configured to present the components in a first tree control and the names of the filesets in a second tree control.

8. The apparatus of claim 7, wherein the presentation module is further configured to expand a corresponding branch of the second tree control in response to expanding a branch of the first tree control.

9. The apparatus of claim 7, wherein the presentation module is further configured to expand a corresponding branch of the first tree control in response to expanding a branch of the second tree control.

10. The apparatus of claim 5, wherein;
   the input module is further configured to obtain a second mapping between each fileset and a set of storage volumes;
   the presentation module is further configured to simultaneously present each fileset and the set of storage volumes corresponding to each fileset within the single window; and
   the refresh module is further configured to update the presentation of the fileset and corresponding set of storage volumes in response to changes made to the second mapping.

11. A Graphical User Interface (GUI) for presenting a mapping of a file system to a group of filesets, the GUI comprising:
   an input module configured to obtain a mapping between components of a file system and a group of filesets of a storage area network, each fileset comprising a logical segmentation of the storage area network, the mapping associating each component with a fileset;
   a data module configured to compile statistical information for each fileset;

a window configured to simultaneously display side by side the components in a first tree control and the fileset corresponding to each component in a second tree control such that each fileset is visually associated with one or more components within the window and each component is visually associated with a corresponding name of a fileset within the single window, the window further configured to display the statistical information for each fileset within the single window; and a refresh module configured to update the window in response to changes made to the mapping.

12. The GUI of claim 11, wherein the first tree control comprises branch icons representative of directories of the file system and leaf icons representative of links and files of the file system.

13. The GUI of claim 12, wherein the first tree control is further configured to highlight the branch icons of the first tree control that correspond to fileset attach points.

14. The GUI of claim 11, wherein the window further comprises a file system pane displayed alongside a fileset pane.

15. The GUI of claim 13, wherein the file system pane and the fileset pane are selectively updated in response to user input with the file system pane and the fileset pane.

16. The GUI of claim 11, wherein the tree controls are further configured to expand or collapse a corresponding branch of the second tree control in response to expanding or collapsing a branch of the first tree control.

17. A system for presenting a mapping of a file system to a group of filesets, the system comprising:
 a host configured to utilize files stored in a file system;
 a storage device configured to store components of the file system in a group of filesets, each fileset comprising a logical segmentation of the storage device;
 a metadata server configured to process requests to access the file system, the metadata server comprising a configuration module including,
  an input module configured to obtain a mapping between the components of the file system and the group of filesets, the mapping associating each component of the file system with a fileset;
  a data module configured to compile statistical information for each fileset;
  a presentation module configured to simultaneously present the components, a name of the fileset corresponding to each component, and the statistical information for each fileset to a configuration module client side by side within a single window such that each name of a fileset is visually associated with one or more components within the single window and each component is visually associated with a corresponding name of a fileset within the single window; and
  a refresh module configured to update the presentation of the components and corresponding names of the filesets in response to changes made to the mapping; and
 a storage area network configured to enable data transfer between the host, storage device, and metadata server.

18. A computer readable storage medium tangibly embodying a program of machine-readable instructions executable by a digital processing apparatus to perform operations to present a mapping of a file system to a group of filesets, the operations comprising:
 an operation to obtain a mapping between components of a file system and a group of filesets of a virtual storage device, each fileset comprising a logical segmentation of the virtual storage device, the mapping associating each component of the file system with a fileset;
 an operation to compile statistical information for each fileset;
 an operation to simultaneously present the components, a name of the fileset corresponding to each component, and the statistical information for each fileset side by side within a single window such that each name of a fileset is visually associated with one or more components within the single window and each component is visually associated with a corresponding name of a fileset within the single window; and
 an operation to update the presentation of the components and corresponding names of filesets in response to changes made to the mapping, each of the operations stored on one or more computer readable storage media.

19. The computer readable storage medium of claim 18, further comprising an operation to highlight the directories corresponding to fileset attach points.

20. The computer readable storage medium of claim 18, wherein the components of the file system comprise links, directories, and files.

21. The computer readable storage medium of claim 18, wherein the operation to present comprises presenting the components in a first tree control and the names of filesets in a second tree control.

22. The computer readable storage medium of claim 21, further comprising an operation to collapse a corresponding branch of the second tree control in response collapsing a branch of the first tree control.

23. The computer readable storage medium of claim 21, further comprising an operation to collapse a corresponding branch of the first tree control in response to collapsing a branch of the second tree control.

24. The computer readable storage medium of claim 21, further comprising an operation to expand a corresponding branch of the second tree control in response to expanding a branch of the first tree control.

25. The computer readable storage medium of claim 21, further comprising an operation to expand a corresponding branch of the first tree control in response to expanding a branch of the second tree control.

26. The computer readable storage medium of claim 18, further comprising:
 an operation to obtain a second mapping between each fileset and a set of storage volumes;
 an operation to simultaneously present each fileset and the set of storage volumes corresponding to each fileset within the single window; and
 an operation to update the presentation of the fileset and corresponding set of storage volumes in response to changes made to the second mapping.

27. The computer readable storage medium of claim 18, wherein the mapping comprises mapping at least one component to one fileset.

28. An apparatus for presenting a mapping of a file system to a group of filesets, the apparatus comprising:
 a means for obtaining a mapping between components of a file system and a group of filesets of a virtual storage device, each fileset comprising a logical segmentation of the virtual storage device, the mapping associating each component of the file system with a fileset, each fileset having a different name than the associated components of the file system;
 a means for compiling statistical information for each fileset;
 a means for simultaneously presenting the components, a name of the fileset corresponding to each component, and the statistical information for each fileset side by side within a single window such that each name of a fileset is visually associated with one or more components within the single window and each component is visually associated with a corresponding name of a fileset within the single window; and a means for updating the presentation of the components and corresponding names of filesets in response to changes made to the mapping.

* * * * *